(12) United States Patent
Katzen et al.

(10) Patent No.: US 6,539,295 B1
(45) Date of Patent: Mar. 25, 2003

(54) VEHICLE TIRE MONITORING SYSTEM WITH MULTIPLE SENSORS

(75) Inventors: James Alexander Katzen, Boston, MA (US); Kirk Charles NcNeil, Ann Arbor, MI (US); Todd Larry Mory, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,562

(22) Filed: Jan. 18, 2002

(51) Int. Cl.⁷ .............................................. G01M 17/02
(52) U.S. Cl. ....................................................... 701/29
(58) Field of Search .............................. 701/29, 33, 35; 340/442; 73/8; 116/34 R

(56) References Cited

U.S. PATENT DOCUMENTS

| | | | |
|---|---|---|---|
| 5,247,831 A | 9/1993 | Fioravanti | 73/178 |
| 5,749,984 A | 5/1998 | Frey et al. | 152/415 |

*Primary Examiner*—Yonel Beaulieu
(74) *Attorney, Agent, or Firm*—Gregory P. Brown

(57) ABSTRACT

A vehicle tire monitoring system provides enhanced information about the contact patch interface area between the tire and the underlying road surface. The system has first, second, and third sensors (20A, 20B, and 20C) located on a tire (12) and sensing first, second, and third tread contact lengths ($L_A$, $L_B$, and $L_C$) during which the tire (12) contacts the ground surface (18). The system also includes a controller (42) for processing the first, second, and third tread contact lengths ($L_A$; $L_B$, and $L_C$) to determine a characteristic of the monitored tire (12).

28 Claims, 9 Drawing Sheets

VEHICLE TIRE MONITORING SYSTEM WITH MULTIPLE SENSORS

BACKGROUND OF INVENTION

The present invention generally relates to monitoring tires on a wheeled vehicle, and more particularly to a tire monitoring system and method that senses characteristics of the tread portion of a tire to monitor tire performance.

Wheeled vehicles commonly employ pneumatic tires each mounted on a wheel for contacting the surface of the underlying road. In order to optimize vehicle performance and minimize tire wear and tear, it is important to maintain certain tire characteristics such as the proper tire inflation and tire/wheel-to-road camber to achieve a desired tire-to-road surface interface in order to optimize vehicle grip to the road surface. Tire over-inflation and under-inflation can lead to uneven tread wear, lessened grip at the tire-to-road interface, and reduced tire performance, amongst other problems. The handling characteristics of a wheeled vehicle are directly attributable to the amount of grip, both lateral and longitudinal, obtained by the tire-to-road interface. Thus, it is desirable to optimize tire performance by adjusting vehicle parameters including tire pressure, camber, aerodynamic down force, and other parameters.

To optimize tire performance, it is desirable to monitor the tire-to-road interface. In the past, indirect monitoring techniques have been employed to measure tire contact with the road surface. One technique measures temperature of the tire and uses time-weighted temperature measurements. However, non-uniform airflow around the tires may cause skewed results from uneven cooling. Another technique for monitoring tire contact employs wear measurements, such as measuring a circumferential length of the tire. However, conventional wear measurement techniques generally require extended running to obtain measurement results, and often require trial-and-error methods of tuning.

Another example of a tire monitoring system for sensing the tire-to-road interface is disclosed in U.S. Pat. No. 5,749,984, the disclosure of which is hereby incorporated by reference. The aforementioned patent discloses the use of a single contact sensor located within the tire for monitoring the center tread contact patch length of the tire as the tire contacts the underlying road surface. According to this prior approach, the center tread contact patch length is processed to determine under-inflation and over-inflation of the tire, as well as tire revolutions and speed. While the aforementioned approach provides some degree of accuracy of the tire inflation, a number of drawbacks exist. First, this prior approach assumes that the tire/wheel camber is zero degrees, and thus assumes that the tire is perfectly straight such that the tread portion is parallel to the ground surface. Secondly, the use of a central contact patch length alone provides only a limited degree of accuracy. Third, the amount of information obtained by the single center contact patch length is limited and, thus, does not allow for optimization of other vehicle driving characteristics.

Accordingly, it is therefore desirable to provide for an enhanced vehicle tire monitoring system that monitors the contact surface area between the tire and the underlying road surface. More particularly, it is desirable to provide for such a tire monitoring system that provides enhanced optimization characteristics to overcome the above-mentioned drawbacks of the prior art tire monitoring approaches.

SUMMARY OF INVENTION

The present invention improves the tire monitoring on a vehicle by providing enhanced information about the contact patch interface area between the tire and the underlying road surface. To achieve this and other advantages, and in accordance with the purpose of the invention as embodied and described herein, the present invention provides for a vehicle tire monitoring system comprising multiple sensors including a first sensor located on a tire and generating a first electrical signal containing information about a first tread contact length and a second sensor located on the tire for generating a second electrical signal containing information about a second tread contact length. The system includes a controller for processing the first and second electrical signals and determining a first tread contact length associated with the first electrical signal and a second tread contact length associated with the second electrical signal. The controller processes the first and second tread contact lengths to determine a characteristic of the monitored tire.

These and other features, advantages and objects of the present invention will be further understood and appreciated by those skilled in the art by reference to the following specification, claims and appended drawings.

BRIEF DESCRIPTION OF DRAWINGS

The present invention will now be described, by way of example, with reference to the accompanying drawings.

DETAILED DESCRIPTION

Figure 1:
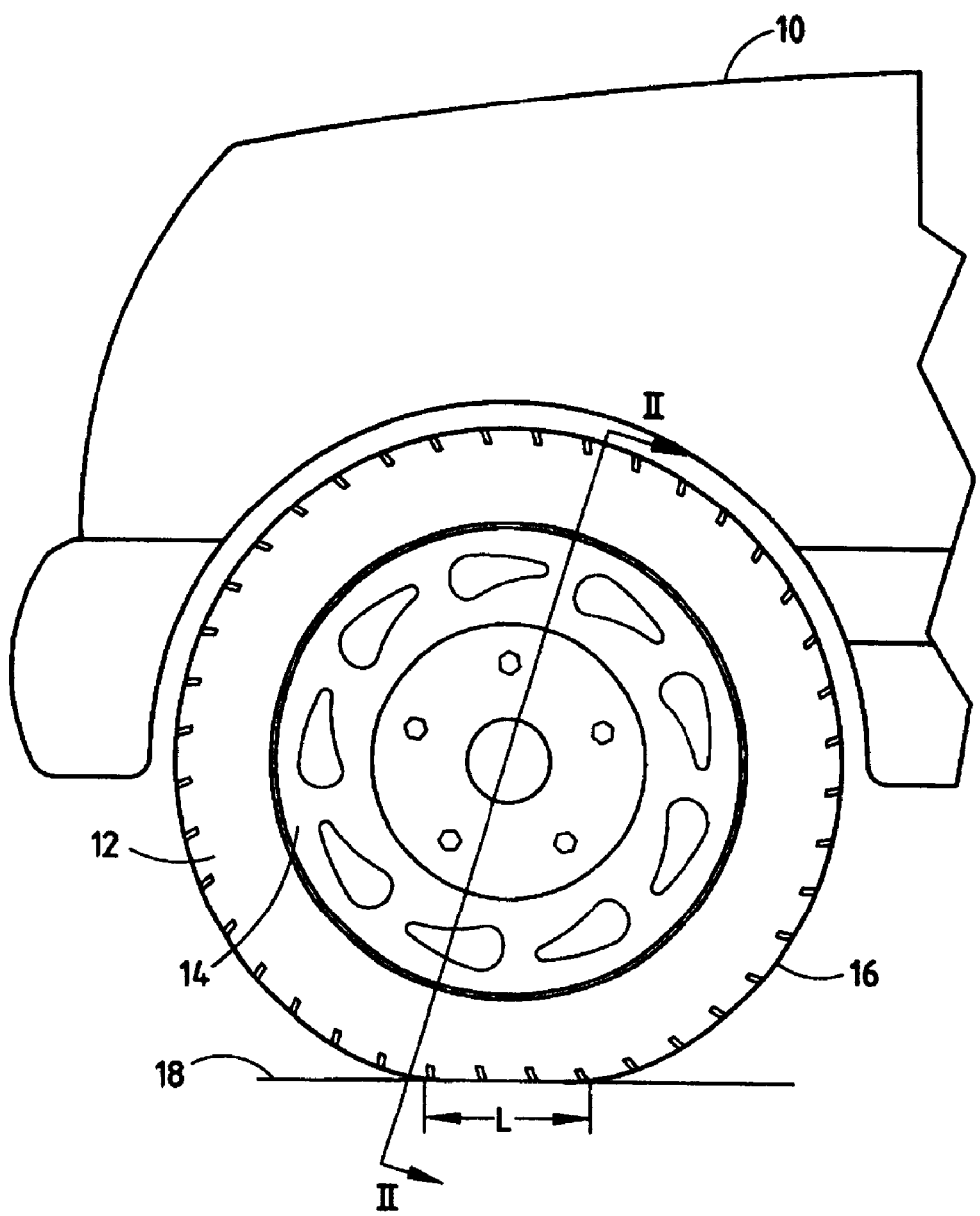
FIG. 1 is a side elevational view of a portion of a vehicle showing a tire and wheel assembly contacting a road surface.

Referring to FIG. 1, a tire and wheel assembly mounted on a wheeled vehicle 10 is shown including a tire 12 mounted on the rim of a wheel 14 and further in contact with the underlying ground (e.g., road) surface 18. The wheeled vehicle 10 may be equipped with any number of tire and wheel assemblies, such as four tires and wheels, as is commonly employed on automotive vehicles. The tire 12 includes a tread portion 16 formed about the outer peripheral circumference thereof, for contacting the underlying road surface 18. The tire 12 is a pneumatic tire that has an inflated tire pressure preferably within a desired operating range. The outer peripheral tread portion 16 of tire 12 has a constant circumferential length which is substantially round. However, under vehicle load, the tread portion 16 of tire 12 has a flattened contact patch area at the tire-to-road surface interface. The contact patch area is generally shown having a length L at the tire-to-road surface interface. According to the present invention, the contact patch length L is measured at multiple laterally spaced locations on the tire and is used to monitor the tire performance as described hereinafter.

Figure 2:
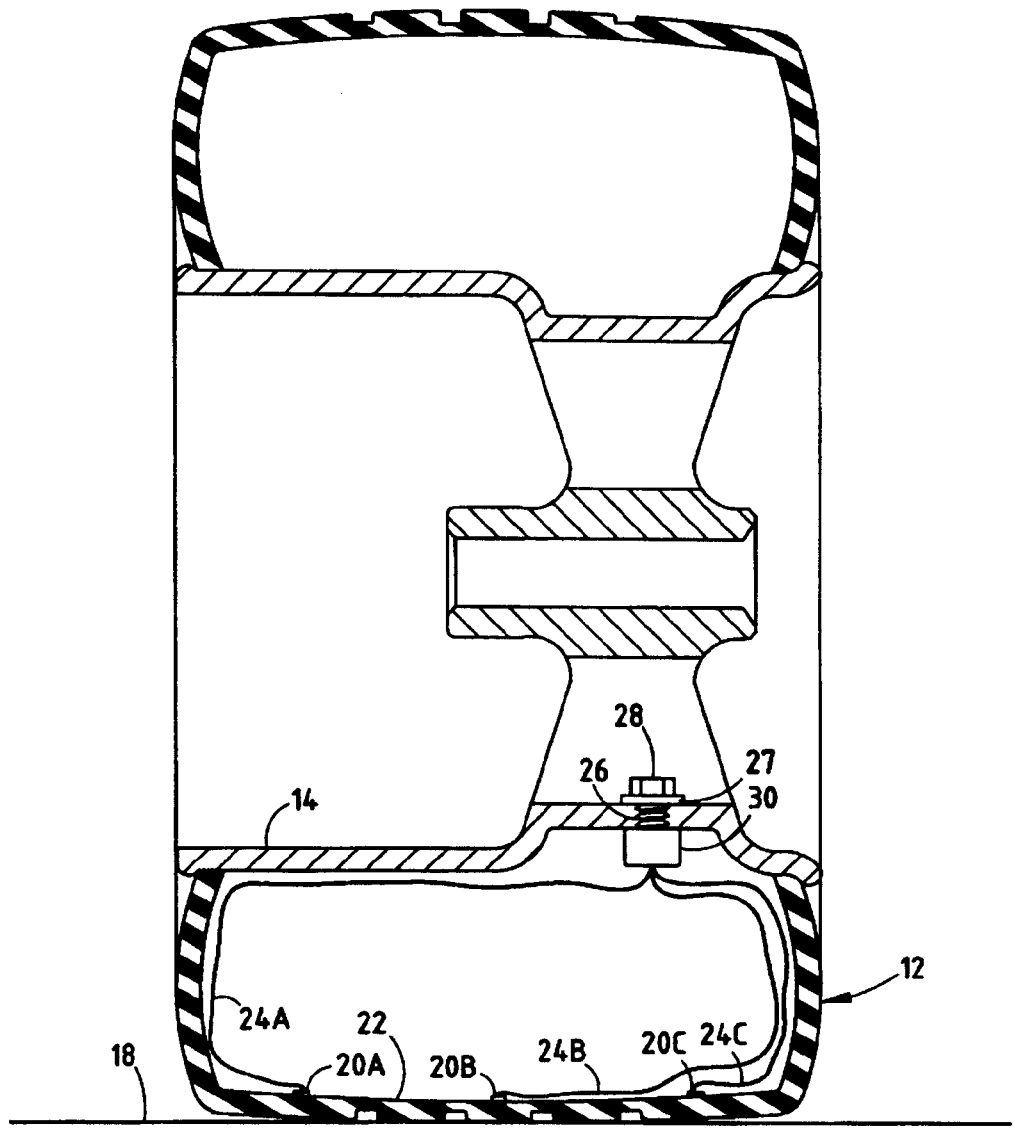
FIG. 2 is a cross-sectional view of the tire and wheel assembly illustrating three sensors mounted within the tire according to the present invention.

Referring to FIG. 2, the tire and wheel assembly is further shown employing three contact sensors 20A–20C mounted to the inner wall 22 of the tread portion of tire 12 at three laterally spaced locations, according to the present invention. Each of the contact sensors 20A–20C monitors deformation of the tread portion of tire 12 at the point of location of the respective sensors so as to detect deformation of the tread portion as the sensor enters and exits the contact patch area at the tire-to-road surface interface. Accordingly, each of sensors 20A–20C senses a tread contact length at the beginning and end of the contact patch area as discussed herein. According to one embodiment, each of sensors 20A–20C may include a piezo-resistive-type sensor such as part no. 0-1002794-1, commercially made available by Measurement Specialties Inc. According to a second embodiment, each of the sensors 20A–20C may include a resistive ink flex sensor such as part No. 150551, commercially made available by Jameco Electronics. It should be appreciated that other types of sensors may be employed for detecting contact patch length. Other known sensors may include photoresistive fiber optic sensors, variable capacitor-type sensors, and variable inductor-type sensors.

The second contact sensor 20B is preferably mounted about the central longitudinal axis of the tread portion midway between the upstanding side walls of the tire for detecting a contact patch length $L_B$ at the middle point of the tire. The first and third contact sensors 20A and 20C, respectively, are laterally disposed on opposite sides of the second contact sensor 20B and are located more closer to the left and right side walls of tire 12, respectively. Accordingly, the first contact sensor 20A senses a contact patch length $L_A$ at a point near the left side of the contact patch area, while the third contact sensor 20C senses a contact patch length $L_C$ at a point near the right side of the contact patch area. It should be appreciated that each of the contact sensors 20A–20C may be bonded or otherwise attached to the inner surface of the tread portion of tire 12 by any of a number of known bonding techniques, and may further be covered with a rubber patch (not shown).

Each of the contact sensors 20A–20C are shown connected to a controller/transmitter housing 30 via respective lead lines 24A–24C. Lead lines 24A–24C allow for transmission of the sensed signals from each of sensors 20A–20C to the controller/transmitter housing 30 for processing and transmission to a remote vehicle controller as explained hereinafter. Lead lines 24A–24C may be bonded or otherwise attached to the inner walls of tire 12. While hard-wired sensors are described herein, it should be appreciated that sensors 20A–20C could alternately employ wireless signal transmissions, without requiring the use of lead lines 24A–24C.

The controller/transmitter housing 30 is rim mounted to wheel 14 via fastening screw 26 and nut 28. In addition, a seal 27 is disposed between nut 28 and wheel 14 to prevent air leakage from the tire/wheel assembly. By rim mounting the controller/transmitter housing 30 to wheel 14, a battery supplying power to the controller and transmitter may be exposed outside the tire, thus permitting easy access to replace the battery. Additionally, the controller/transmitter housing 30 is able to withstand high forces, including centrifugal force generated during excessive wheel speeds such as those experienced during vehicle racing conditions. However, it should be appreciated that the controller/transmitter housing 30 could alternately be mounted elsewhere, such as to the upstanding side wall or bead area of tire 12.

Figure 3:
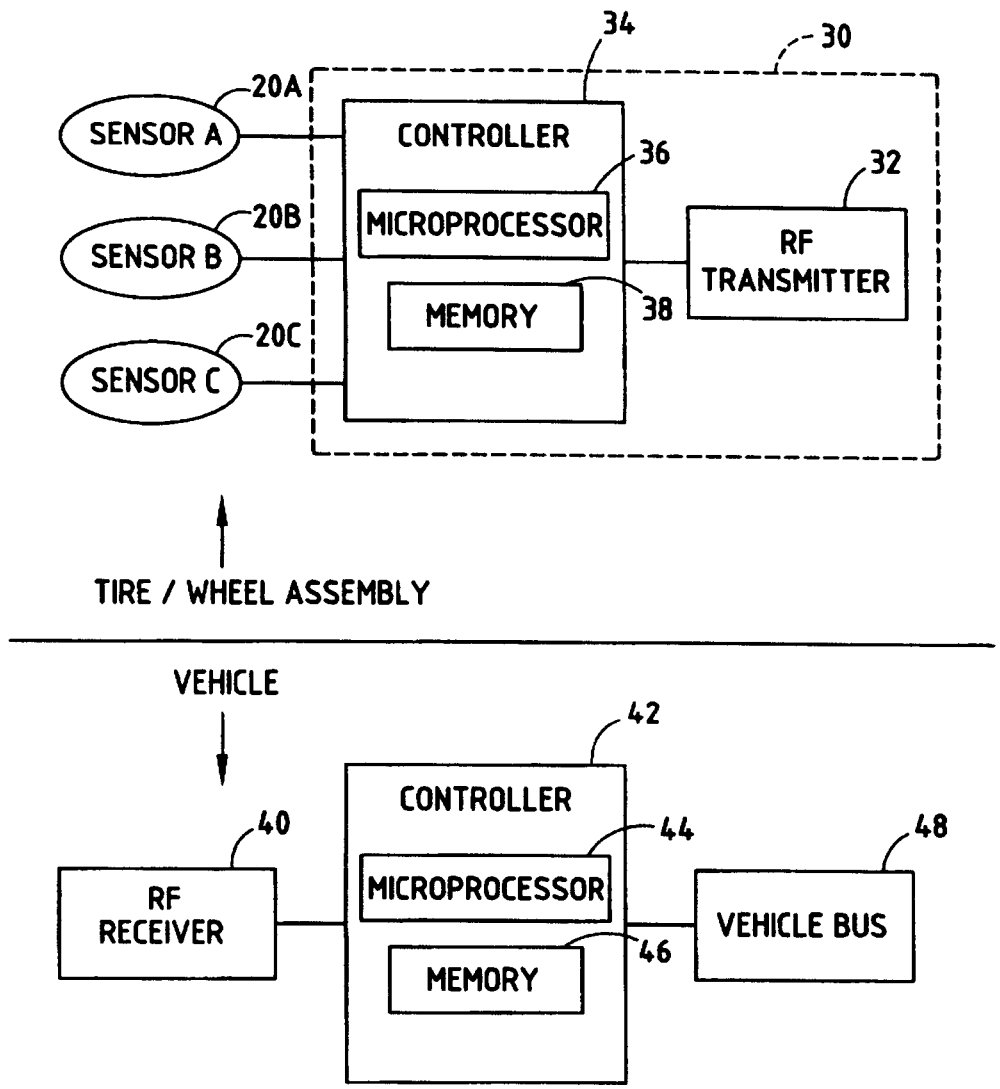
FIG. 3 is a block diagram illustrating the signal sensing and processing hardware according to one embodiment of the present invention.

The controller/transmitter housing 30 is shown in more detail in FIG. 3 for communicating digital messages to a remotely located radio frequency (RF) receiver 40 and controller 42 located in the vehicle. The controller/transmitter housing 30 includes a controller 34 having a microprocessor 36 and memory 38, such as volatile random access memory (RAM) and non-volatile read only memory (ROM). The microprocessor 36 may include a conventional commercially available processor for processing computer software stored in non-volatile memory, and for generating signals which, in turn, may be stored in volatile memory. Also included in housing 30 is a RF transmitter 32 for transmitting the digital messages via RF signals. While an RF signal transmission is shown and described herein, it should be appreciated that alternate signal communication links may be employed in place of the RF signal transmission. Alternative signal communication links may include the use of an electrical slip ring, an infrared (IR) link, an inductive link, or other known communication links.

The transmitted RF signals are received by the RF receiver 40 and are further processed by a controller 42. Controller 42 may include any of a number of vehicle controllers having a microprocessor 44 and memory 46, such as an active suspension controller or a stand-alone controller. Microprocessor 44 processes computer software, which may be stored in non-volatile memory, and generates control output signals, which may be stored in volatile memory. The generated control output signals may further be transmitted to a vehicle bus 48 and made available to other control devices within the vehicle.

Figure 4:
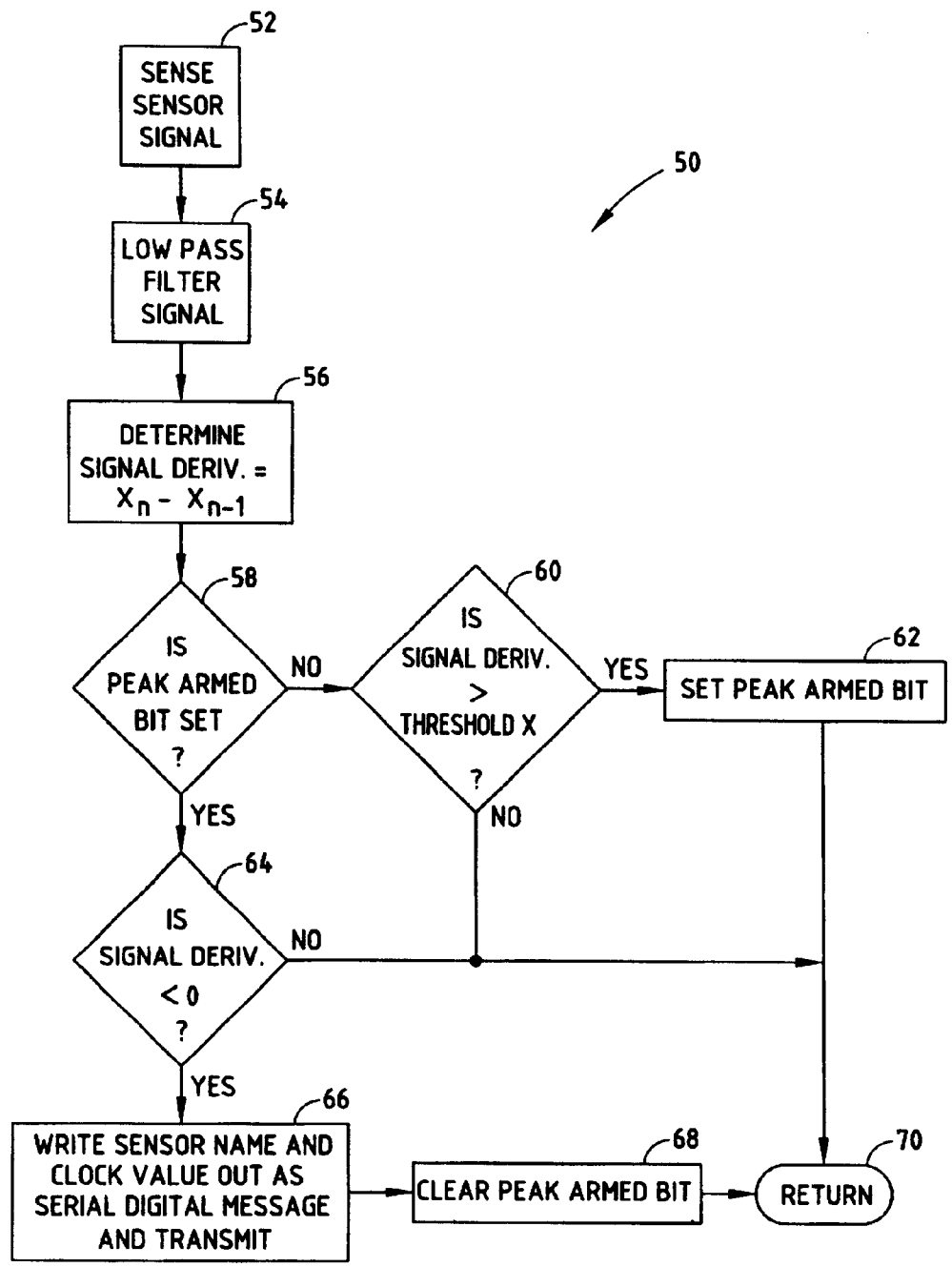
FIG. 4 is a flow diagram illustrating a signal processing routine for processing of the sensed signals within the controller located in the tire and wheel assembly.

A signal processing routine 50 is illustrated in FIG. 4 for processing each of the three sensed signals generated by sensors 20A–20C. Signal processing routine 50 is preferably stored in memory 38 and processed by microprocessor 36 to generate and transmit a serial digital message containing time measurements at each peak amplitude for each sensor signal. The signal processing routine 50 may be repeated in series for each sensed signal, or may include three such control routines operating in parallel for generating the peak amplitude time measurements for the three sensed signals. The serial digital message contains two time measurements for each sensed signal, and thus contains a total of six time measurements that are generated for transmission.

Signal processing routine 50 begins in step 52 by sensing the sensor signal from one of sensors 20A–20C. In step 54, the sensed signal is low pass filtered to remove noise and other high frequency error signals. Next, routine 50 determines a signal derivative as the difference between the current (n) sensed signal and the preceding (n-1) sensed signal. In decision step 58, routine 50 checks for whether the peak armed bit is set. If the peak armed bit is not set, routine 50 proceeds to decision step 60 to determine if the signal derivative is greater than a threshold value X and, if not, returns to the beginning of the routine 50. If the signal derivative is greater than the threshold X, the peak armed bit is set in step 62 before returning to the beginning of the routine 50. If the peak armed bit is set as determined in decision step 58, routine 50 proceeds to decision step 64 to check if the signal derivative is less than zero and, if not, returns to the beginning of the routine in step 70. Otherwise, if the signal derivative is less than zero, routine 50 proceeds to step 66 to write the sensor name and clock time value out as a serial digital message, and further transmits the message via the RF transmitter. Next, in step 68, the peak armed bit is cleared before returning to the beginning of the routine 50. Accordingly, signal processing routine 50 generates a series of peak amplitude time measurements for each of the sensed signals which are written into a serial message and transmitted via the RF transmitter to the vehicle controller for further processing.

Figure 5:
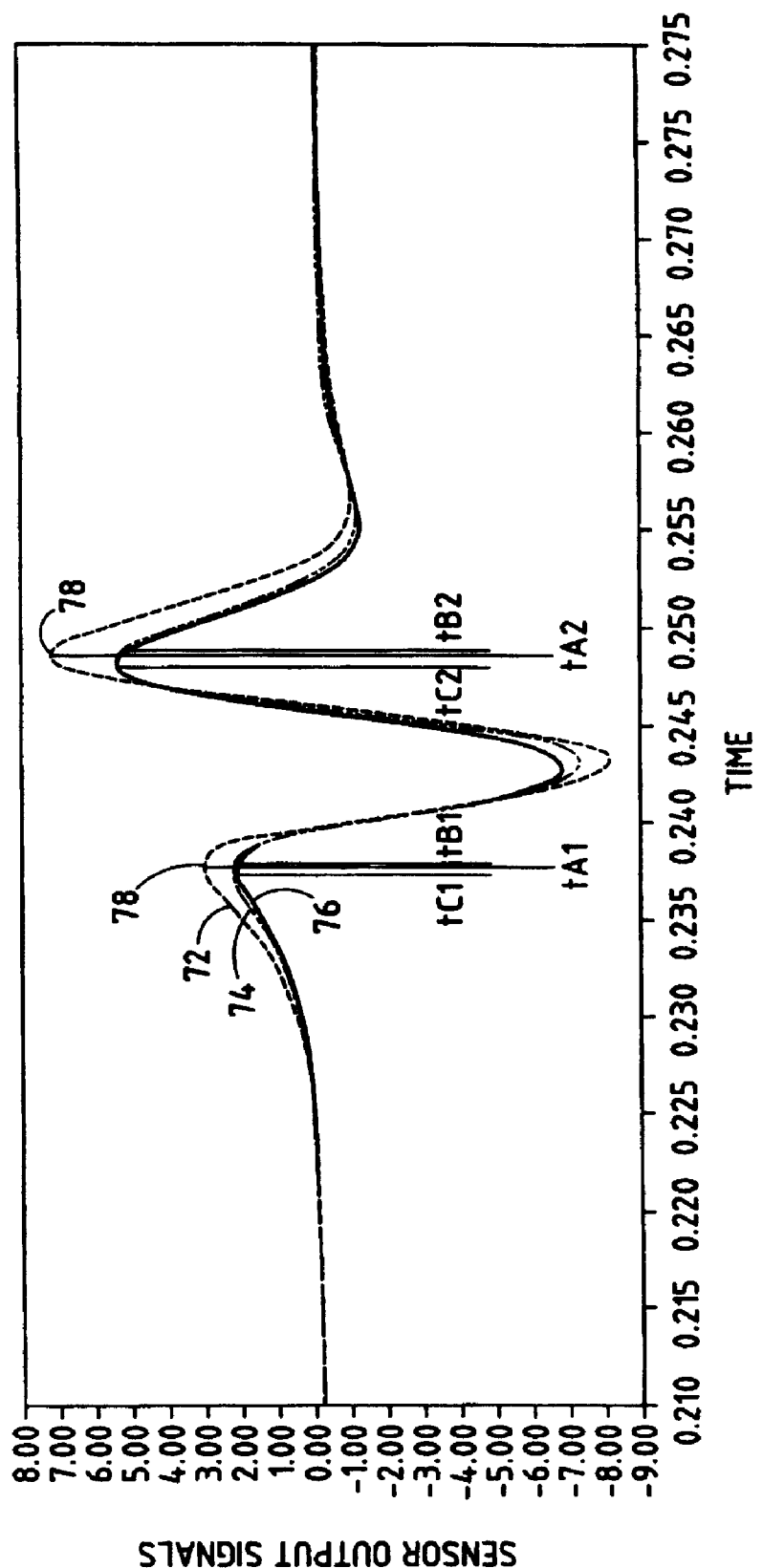
FIG. 5 is a plot of the three electrical signals generated by the three sensors, according to one example.

With particular reference to FIG. 5, examples of sensor output signals generated by each of sensors 20A–20C are illustrated therein. Sensors 20A–20C generate voltage signals 72, 74, and 76, respectively. Each of signals 72–76 includes peak amplitudes 78 which are detected, and the time measurement of each peak amplitude is recorded. Accordingly, six time measurements tA1, tA2, tB1, tB2, tC1, and tC2 are recorded. The recorded time measurements are transmitted in a digital message to vehicle controller 42, where the time periods between adjacent peak amplitudes for each signal are calculated. The measured time period between peak amplitudes for sensed signal 72 is the difference tA2–tA1. Likewise, the measured time periods between peak amplitudes for sensed signals 74 and 76 are tB2–tB1, and tC2–tC1, respectively. The measured time differences represent the amount of time the tire is sensed to be in contact with the road surface 18 during the tire tread contact patch lengths $L_A$, $L_B$, and $L_C$. By knowing the overall time period that each sensor senses contact with the road surface, a proportion of each tread contact length to the overall circumferential length of the tire can be determined.

Figure 6A:
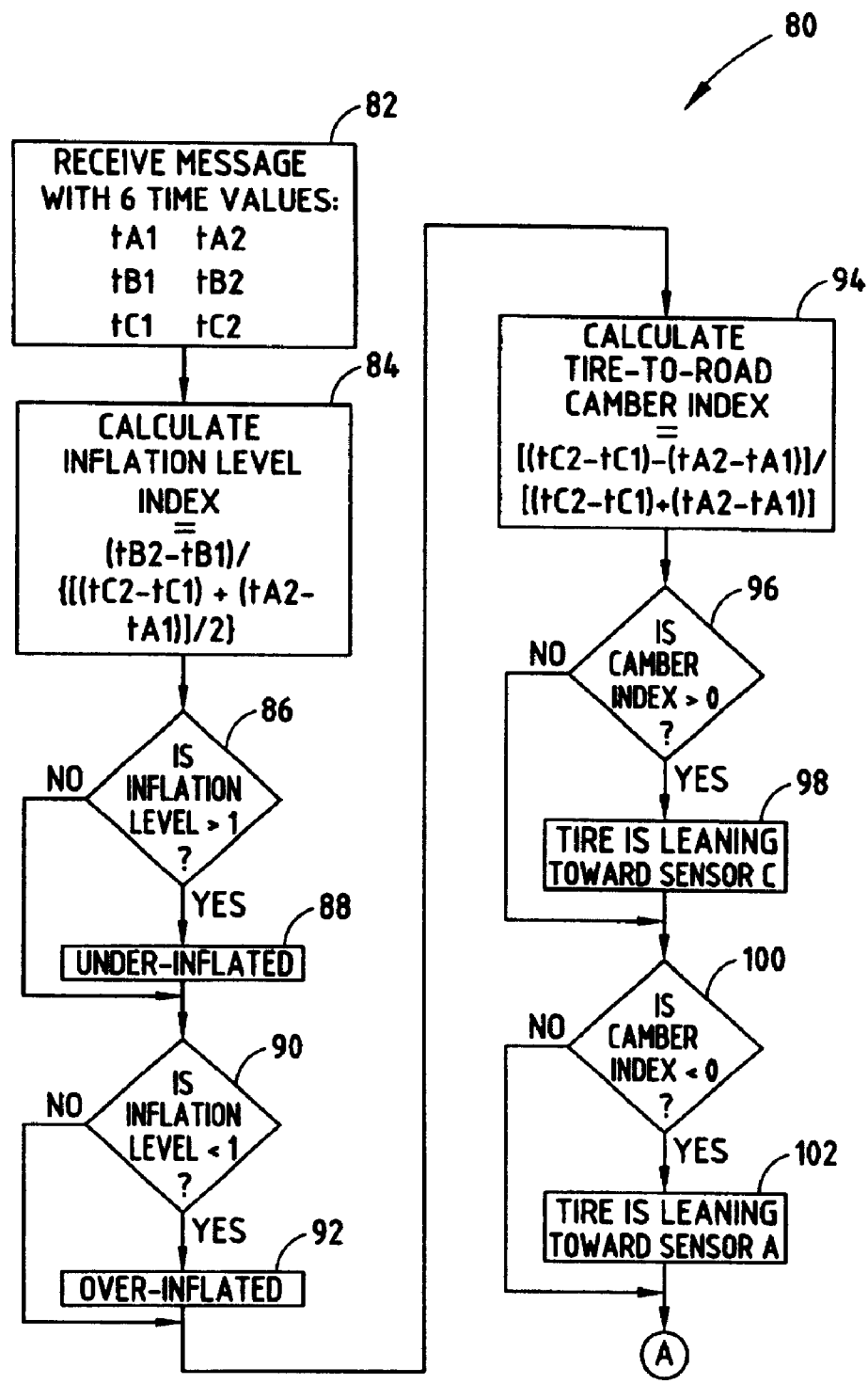
FIGS. 6A and 6B are flow diagrams illustrating a control routine for processing the sensed contact patch lengths for use in various applications according to the present invention.
Figure 6B:
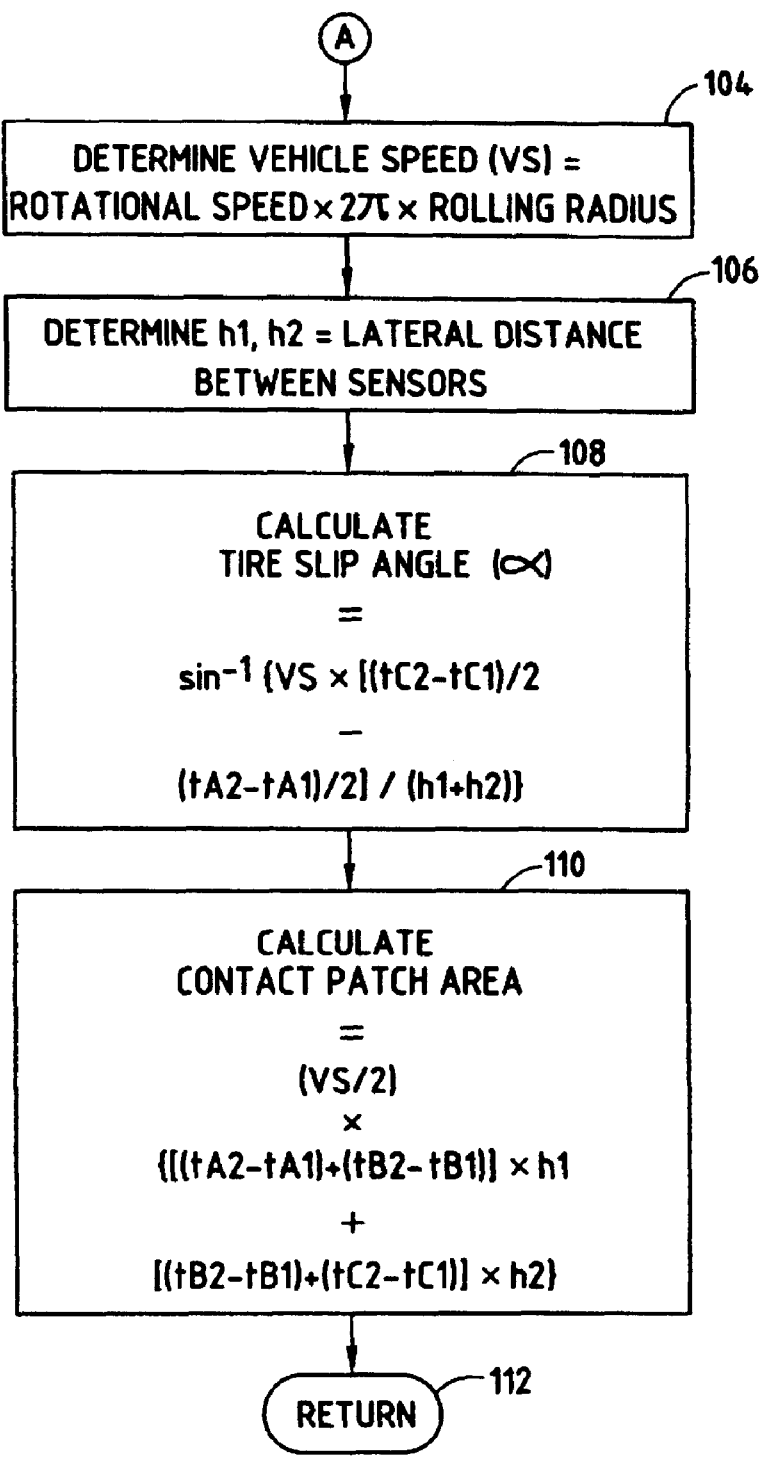

Referring to FIGS. 6A and 6B, a control routine 80 for processing the serial digital message received by RF receiver 40 is illustrated therein. Control routine 80 may be implemented as computer software stored in memory 46 and processed via microprocessor 44 in vehicle controller 42. Control routine 80 processes the six time values tA1, tA2, tB1, tB2, tC1, and tC2 included in the received message and determines various tire characteristics including tire inflation, tire-to-road camber, tire slip angle, and the tread contact patch area of the tire-to-road interface. By calculating two or three of the contact patch lengths $L_A$, $L_B$, and $L_C$, various tire characteristics can be determined. From these monitored tire characteristics, the vehicle operator and/or adaptive vehicle system(s) can take corrective action to enhance tire and vehicle performance.

Control routine 80 includes step 82 of receiving the transmit message containing the six time values, tA1, tA2, tB1, tB2, tC1, and tC2. The six time values correspond to the time measurements measured at the peak amplitudes of each of the sensed signals for sensors 20A–20C. Proceeding to step 84, control routine 80 calculates an inflation level index indicative of the relative pneumatic inflation of the tire. In the equation shown in step 84, the inflation level index is calculated as a ratio of the center contact patch length $L_B$ divided by the average of the side contact lengths $L_A$ and $L_C$. It should be appreciated that an indication of tire inflation can be made by comparing the center contact patch length $L_B$ with either or both of the side contact patch lengths $L_A$ and $L_C$. The inflation level index is used to determine the relative pneumatic inflation of the tire. Decision step 86 determines if the tire inflation level is greater than one and, if so, a determination that the tire is under-inflated is made in step 88. Decision step 90 determines if the tire inflation level is less than one and, if so, a determination that the tire is over-inflated is made in step 92. It should be appreciated that if the tire is under-inflated or over-inflated, a message indicator may be provided to the vehicle operator, and/or corrective action may be taken to provide proper tire inflation in an adaptive tire inflation adjustment system.

Proceeding to step 94, control routine 80 calculates a tire-to-road camber index which is indicative of the relative tire-to-road camber. According to the equation shown, the camber index is calculated as a function of the difference in contact patch lengths $L_C$ and $L_A$ divided by the sum of the contact patch lengths $L_C$ and $L_A$. It should be appreciated that contact patch lengths $L_C$ and $L_A$ may be otherwise be compared to provide a relative indication of the tire-to-road camber. Decision step 96 determines if the camber index is greater than zero and, if so, determines that the tire is leaning toward sensor C (right camber) in step 98. Decision step 100 determines if the camber index is less than zero and, if so, determines if the tire is leaning toward sensor A (left camber) in step 102. It should be appreciated that the driver may be notified of the determined tire-to-road camber condition and/or corrective action may be taken to correct the tire camber in an adaptive camber adjustable system.

Control routine 80 further includes step 104 of determining vehicle speed (VS) as the product of rotational speed multiplied by $$2\pi|$$

and the rolling radius of the tire. Next, in step 106, the lateral separation distances h1 and h2 between sensors 20A and 20B, and 20B and 20C, respectively, is determined. In step 108, the control routine 80 calculates a tire slip angle o which is indicative of the angular rotation between the tire/wheel heading and the direction of travel of the tire/wheel. The tire slip angle, as shown in the equation in step 108 is calculated by calculating the inverse sine of the VS multiplied by the difference in one-half the contact patch length $L_C$ minus one-half contact patch length $L_A$ divided by the summation of distances h1 and h2. It should be appreciated that the tire slip α provides an indication of the wheel heading relative to the direction of travel of the tire. By knowing the slip angle α, the vehicle operator and/or an adaptive vehicle control system can take corrective action and response thereto.

Next, step 110, control routine 80 calculates a contact patch area as a function of one-half VS multiplied by the summation of contact patch lengths $L_A$ and $L_B$ multiplied by distance h1 summed with the sum of the contact patch lengths $L_B$ and $L_C$ multiplied by distance h2. The contact patch area is measured essentially by adding up the sum total area of the left and right side trapezoids defined by the shape of the resultant contact patch lengths $L_A$, $L_B$, and $L_C$. Following step 110, control routine 80 returns in step 112 to the beginning of the control routine. By knowing the contact patch area, the vehicle tire may be adjusted to optimize the lateral and longitudinal grip of the tire.

Figure 7:
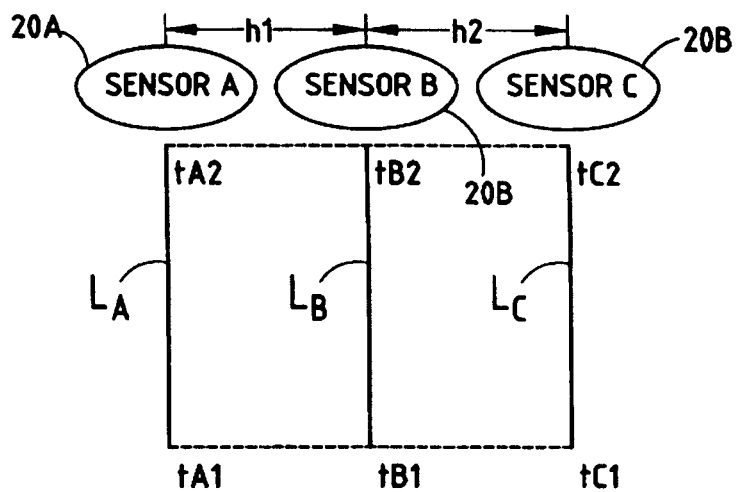
FIG. 7 is a schematic diagram illustrating tread contact lengths measured by each of the three sensors.

Referring to FIG. 7, an example of a contact patch area at the tire-to-road surface interface is provided therein for a properly inflated tire. As shown, sensor A (20A) measures a contact patch length $L_A$ during the time periods tA1 and tA2 on the left side of the tread portion, sensor B (20B) measures a contact patch length $L_B$ during time periods tB1 and tB2 in the middle of the tire, and sensor C (20C) measures the contact patch length $L_C$ during time periods tC1 and tC2 on the right side of the tread portion. The contact patch area is approximated by drawing the dashed lines connecting the ends of lengths $L_A$ and $L_B$, and the ends of lengths $L_B$ and $L_C$, as shown. When the tire is properly inflated, the contact patch area, as sensed by sensors 20A–20C, will have a substantially rectangular shape as shown in FIG. 7. In addition, it should be appreciated that sensors 20A–20C are spaced so as to provide a distance h1 between sensor 20A and sensor 20B, and a distance h2 between sensor 20B and sensor 20C, with the distances h1 and h2 being of substantially equal distance.

Figures 8A, 8B:
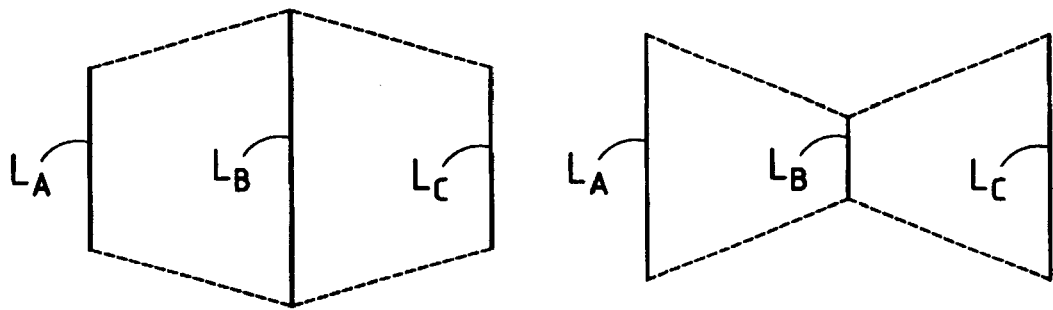
FIGS. 8A and 8B are schematic diagrams illustrating measured tread contact lengths during tire over-inflation and under-inflation conditions, respectively.

An illustration of tire under-inflation detection is provided in FIG. 8A, while tire over-inflation detection is illustrated in FIG. 8B. When the tire is under-inflated, the middle contact patch length $L_B$ is substantially smaller than the side contact patch lengths $L_A$ and $L_C$ as shown in FIG. 8B. When the tire is under-inflated, it should be appreciated that the middle contact patch length $L_B$ will be substantially greater than the side contact patch lengths $L_A$ and $L_C$ as shown in FIG. 8B. Accordingly, determinations of tire over-inflation and under-inflation can be made by comparing at least one of side contact patch lengths $L_A$ and $L_C$ with the middle contact patch length $L_B$. It should be appreciated that a determination of tire over-inflation or tire under-inflation can be made by comparing the contact patch length $L_B$ with either of contact patch lengths $L_A$ and $L_C$. It should also be appreciated that by determining tire inflation as a function of the contact patch lengths $L_A$, $L_B$, and $L_C$, an indication of tire inflation may be provided independent of vehicle load applied to the tire.

Figures 9A, 9B:
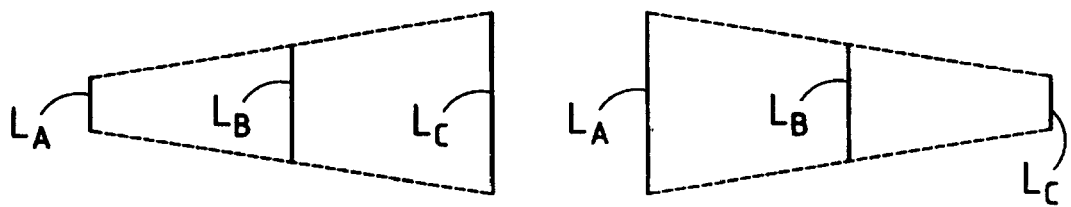
FIGS. 9A and 9B are schematic diagrams illustrating tread contact lengths measured during severe tire camber conditions.

To further illustrate the tire-to-road camber detection, FIG. 9A illustrates a tire leaning toward sensor 20C, while FIG. 9B illustrates the tire leaning toward sensor 20A. When the tire is cambered such that the tire leans towards sensor 20C, the contact patch length $L_C$ is greater than the middle contact patch length $L_B$ which, in turn, is greater than contact patch length $L_A$. Similarly, when the tire is leaning towards sensor 20A, contact patch length $L_A$ is greater than the middle contact patch length $L_B$ which, in turn, is greater than contact patch length $L_C$. Accordingly, the determination of a tire camber condition can be made by comparing the contact patch lengths $L_A$, $L_B$, and $L_C$. Thus, the tire monitoring system of the present invention is able to discriminate between tire over-inflation, under-inflation, and tire-to-road camber. The tire-to-road camber may be determined based on the ratio of contact patch length $L_A$ to contact patch length $L_C$. It should also be appreciated that other ratios such as the ratio $L_A$ to $L_B$ or the ratio $L_C$ to $L_B$, may provide an indication of road-to-tire camber. Thus, either two or three sensors may be employed to determine the camber.

Figure 10:
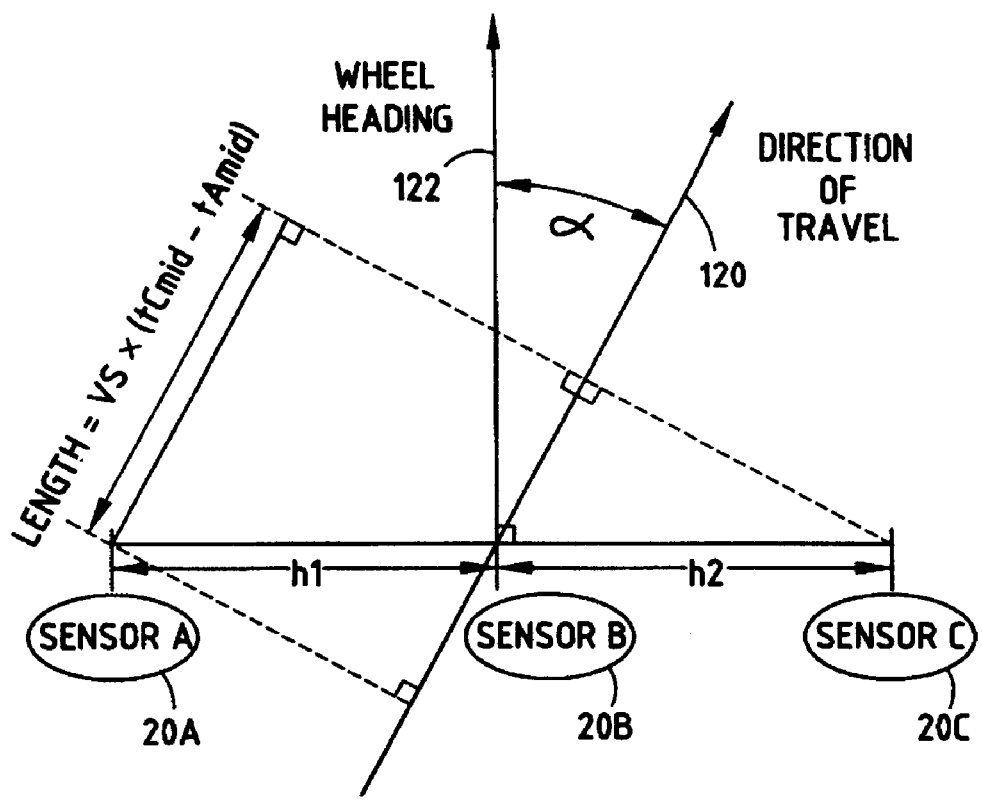
FIG. 10 is a schematic diagram illustrating the computation of a tire slip angle.

Referring to FIG. 10, an example of the phase determination for slip angle computation is provided therein. The slip angle α is the angular rotation between the tire/wheel heading as shown by line 122 and the direction of travel of the tire/wheel 120. The slip angle α is computed by determining the time-based phase of the sensor signal. Since an angle of the wheel with respect to the road will cause one of the outside sensors 20A or 20C to contact the road before the other of the outside sensors 20A or 20C, the slip angle α can be computed by determining the time-based phases of the midpoints of the sensor contact durations, relative to each other.

Accordingly, the tire monitoring system of the present invention advantageously employs a plurality of contact sensors 20A–20C to monitor the tire of the vehicle to achieve enhanced tire monitoring. By employing at least two or three of the contact sensors 20A–20C, a number of tire characteristics can accurately be measured and corrective action can be taken to achieve enhanced vehicle performance. The tire monitoring system allows for calculation of tire inflation, calculation of tire-to-road camber, calculation of the tire slip angle α, and calculation of a contact patch area. In addition to providing a message to the vehicle operator of the aforementioned performance characteristics, it should be appreciated that the tire monitoring system of the present invention may advantageously be employed in an adaptive system that takes corrective action and responds to the monitored conditions. Additionally, the tire information can be used to analyze vehicle dynamics, or as a feedback signal to automatically adjust the suspension geometry, including, but not limited to, active camber, active down force, active steering angle, etc. Further, sensor indications for multiple wheels/tires can be used to determine dynamic center-of-gravity, center-of-pressure for aerodynamic down force, roll-center height, and overall chassis slip of the vehicle, thereby sensing a potential loss of driver control of the vehicle. While a set of three laterally spaced sensors is shown and described herein for providing a single set of measurements for each rotation of the tire, the present invention may be expanded to include multiple sets of sensors which may provide more than one set of measurements per each rotation of the tire. This may include adding a second set of multiple sensors within the tire and sufficiently angularly spaced from the first set of sensors so that only one set of sensors senses a contact patch length at any given time. One or more additional sets of sensors could be wired serially or in parallel with the first set of sensors, or could be configured with separate analog channels connected to the signal processing. By adding multiple sets of additional sensors, further enhanced tire sensing may be achieved. It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A vehicle tire monitoring system for monitoring a tire mounted on a wheel and having a tread portion for contacting a ground surface, said tire monitoring system comprising:
   a first sensor located on a tire and generating a first electrical signal containing information about a first tread contact length;
   a second sensor located on the tire for generating a second electrical signal containing information about a second tread contact length; and
   a controller for processing the first and second electrical signals and determining the first tread contact length based on the first electrical signal and the second tread contact length based on the second electrical signal, said controller further processing the first and second tread contact lengths to determine a characteristic of the monitored tire.

2. The tire monitoring system as defined in claim 1 further comprising a third sensor located on the tire for generating a third electrical signal containing information about a third tread contact length.

3. The tire monitoring system as defined in claim 2, wherein one of the first, second, and third sensors is substantially centered about the tread portion of the tire and is substantially located midway between the other two of the first, second, and third sensors.

4. The tire monitoring system as defined in claim 3, wherein said controller further processes the third electrical signal to determine the third tread contact length, said controller further determining an approximate contact patch area between the tire tread portion and a road surface as a function of the first, second, and third tread contact lengths.

5. The tire monitoring system as defined in claim 1, wherein one of said first and second sensors is located substantially centered about the tread portion of the tire, and the other of the first and second sensors is located toward a side wall of the tread portion of the tire.

6. The tire monitoring system as defined in claim 5, wherein said controller compares the first and second tread contact lengths and determines a tire inflation characteristic.

7. The tire monitoring system as defined in claim 1, wherein said controller determines tire-to-ground surface camber.

8. The tire monitoring system as defined in claim 1, wherein said controller determines a slip angle of the tire.

9. The tire monitoring system as defined in claim 1, wherein the first and second tread contact lengths are determined based on first and second measured time periods, respectively.

10. The tire monitoring system as defined in claim 1 further comprising a transmitter for transmitting the first and second electrical signals to the controller, said controller being located remote from the transmitter.

11. A vehicle tire monitoring system for monitoring a tire mounted on a wheel and having a tread surface for contacting a ground surface, said tire monitoring system comprising:
   a first sensor located on a tire and generating a first electrical signal containing information about a first tread contact length;
   a second sensor located on the tire and generating a second electrical signal containing information about a second tread contact length;
   a third sensor located on the tire and generating a third electrical signal containing information about a third contact length; and
   a controller for processing the first, second, and third electrical signals and determining the first tread contact length based on the first electrical signal, the second tread contact length based on the second electrical signal, and the third tread contact length based on the third electrical signal, said controller further processing the first, second, and third tread contact lengths to determine a characteristic of the monitored tire.

12. The tire monitoring system as defined in claim 11, wherein one of said first, second, and third sensors is substantially centered about a tread portion of the tire and is substantially located midway between the other two of the first, second, and third sensors.

13. The tire monitoring system as defined in claim 12, wherein said other two of the first, second, and third sensors are located near side walls of the tread portion of the tire.

14. The tire monitoring system as defined in claim 11, wherein said controller compares the first, second, and third tread contact lengths and determines a tire inflation characteristic.

15. The tire monitoring system as defined in claim 11, wherein said controller determines a tire-to-ground surface camber.

16. The tire monitoring system as defined in claim 11, wherein said controller determines a slip angle of the tire.

17. The tire monitoring system as defined in claim 11, wherein said controller determines a contact patch area as a function of the first, second, and third tread contact lengths.

18. The tire monitoring system as defined in claim 11, wherein the first, second, and third tread contact lengths are determined based on first, second, and third measured time periods, respectively.

19. The tire monitoring system as defined in claim 11 further comprising a transmitter for transmitting the first, second, and third electrical signals to the controller, said controller being located remote from the transmitter.

20. A method of monitoring a tire mounted on a wheel and having a tread portion for contacting a ground surface, said method comprising the steps of:
   sensing contact of a tread portion of a tire with the ground surface with a first sensor at a first location of a tire;
   sensing contact of the tread portion of the tire with the ground surface with a second sensor at a second location of the tire;
   generating a first electrical signal containing information about a first tread contact length;
   generating a second electrical signal containing information about a second tread contact length;
   processing the first and second electrical signals to determine the first tread contact length based on the first electrical signal and the second tread contact length based on the second electrical signal; and
   determining a characteristic of the monitored tire based on the first and second tread contact lengths.

21. The method as defined in claim 20 further comprising the steps of:
   sensing contact of the tread portion of the tire with the ground surface with a third signal located at a third location of the tire;
   generating a third electrical signal containing information about a third tread contact length; and
   processing the third electrical signal to determine the third tread contact length based on the third electrical signal, wherein said controller determines the characteristic of the monitored tire based on the first, second, and third tread contact lengths.

22. The method as defined in claim 21, wherein one of said first, second, and third locations is substantially centered about the tread portion of the tire and is substantially located midway between the other of the first, second, and third locations.

23. The method as defined in claim 20, wherein one of said first and second locations is substantially centered about the tread portion of the tire, and the other of the first and second locations is located nearer to a side wall of the tread portion.

24. The method as defined in claim 20 further comprising the step of determining a tire inflation characteristic as a function of the first and second tread contact lengths.

25. The method as defined in claim 20 further comprising the step of determining tire-to-ground surface camber as a function of the first and second tread contact lengths.

26. The method as defined in claim 20 further comprising the step of determining a slip angle of the tire as a function of the first and second tread contact lengths.

27. The method as defined in claim 21 further comprising the step of determining a contact patch area as a function of the first, second, and third tread contact lengths.

28. The method as defined in claim 20 further comprising the step of determining a first measured time period that the tread portion of the tire is in contact with the ground at the first location and determining the second time period that the tread portion of the tire is in contact with the ground surface at the second location, wherein the first and second tread contact lengths are determined as a function of the first and second measured time periods.

* * * * *